R. M. BAXTER.
WATER FILTER.
APPLICATION FILED JAN. 20, 1908.
915,821.
Patented Mar. 23, 1909.
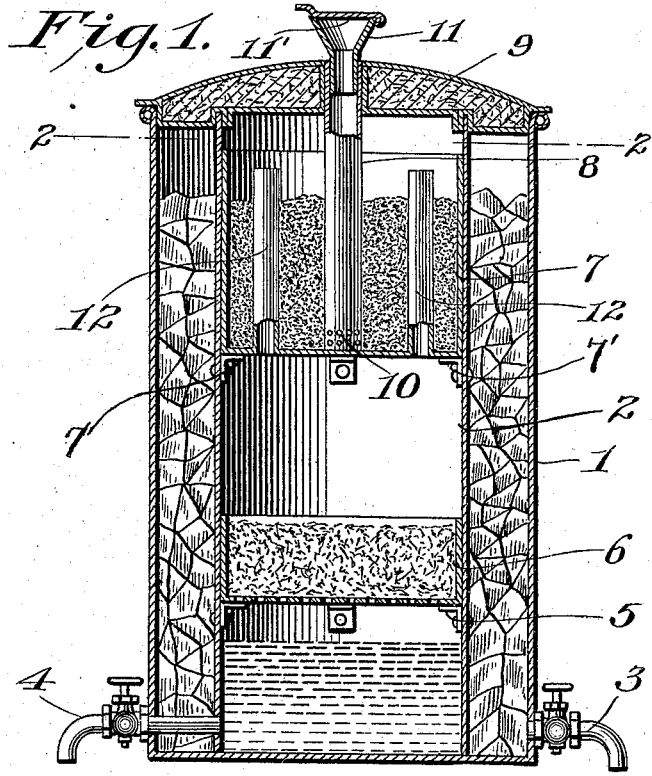
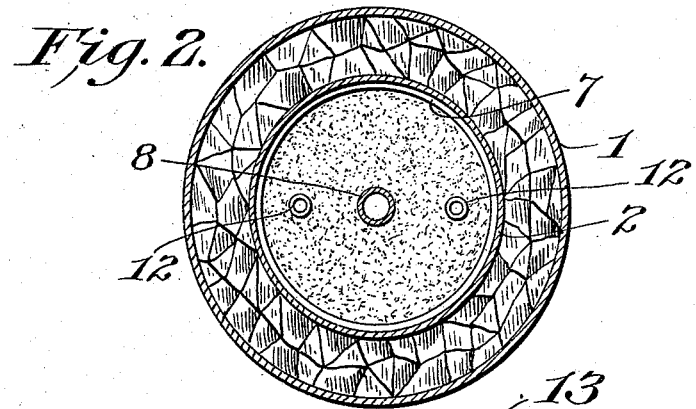
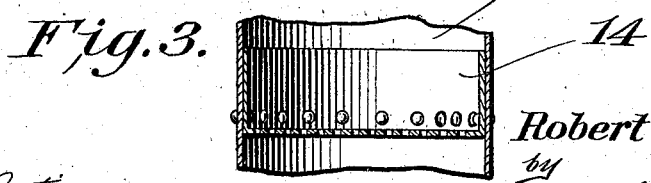
Witnesses
H. J. Austin
A. A. Olson
Inventor
Robert M. Baxter
by
Joshua R. H. Potts
Attorney

UNITED STATES PATENT OFFICE.

ROBERT M. BAXTER, OF HINSDALE, ILLINOIS.

WATER-FILTER.

No. 915,821.      Specification of Letters Patent.      Patented March 23, 1909.

Application filed January 20, 1908. Serial No. 411,666.

To all whom it may concern:

Be it known that I, ROBERT M. BAXTER, a citizen of the United States, residing at Hinsdale, in the county of Dupage and State of Illinois, have invented certain new and useful Improvements in Water-Filters, of which the following is a specification.

This invention relates to filters, and more particularly to a combined water filter and cooler, the object being to provide a filter with a filtering bed, and a bed of gravel or chipped limestone, whereby the water will be filtered as it passes through the filtering bed and as it passes through the gravel or limestone bed its properties will be altered.

Another object of my invention is to provide a filter which is exceedingly simple and cheap in construction, and one which is composed of a very few parts, the parts being so arranged that they can be readily detached, whereby the filter can be thoroughly cleaned.

Another object of my invention is to provide a filter with a water chamber which extends out through the top in which is placed a funnel having a hinged lid whereby the chamber can be readily supplied with water from any suitable source, this chamber being in the form of a tube and extending upwardly centrally from the filtering receptacle and is surrounded by the filtering material, the lower end of the tube being perforated out through which the water passes.

These objects are obtained by the novel arrangement and construction of parts hereinafter fully described and shown in the accompanying drawings, in which:

Figure 1, is a vertical section through my improved filter. Fig. 2, is a horizontal section taken on line 2—2. Fig. 3, is a detailed vertical section of a modified form of fastening the gravel or limestone receptacle within the filter.

Referring to the drawings 1, indicates a cylindrical vessel forming the body of my improved filter having arranged therein a smaller cylinder 2, which is secured to the bottom of the vessel 1, forming a central reservoir and an ice chamber between the same, which is adapted to be filled with ice.

The vessel 1, is provided with a spigot 3, extending into the chamber so as to enable the water in the chamber to be drained off when desired, and the reservoir with a spigot 4, so as to enable the water to be withdrawn from the same.

Secured to the inner sides of the cylinder 2, are angle brackets 5, on which is mounted a receptacle 6, having a perforated bottom and adapted to contain gravel or chipped limestone.

Arranged over the receptacle 6, within the cylinder 2, adjacent its top is a receptacle 7, which is supported by brackets 7', secured to the inside of the cylinder 2. Within the receptacle 7, is a centrally upwardly projecting tube 8, forming a water chamber which is of a greater height than the receptacle 7, and extends up through the opening formed centrally in the hollow cover 9, which is adapted to be filled with non-conducting material. The cover is provided with an annular flange adapted to fit into the ice chamber, and completely close the reservoir and chamber.

The lower end of the tube or water chamber 8, is provided with a plurality of perforations 10, out through which the water is adapted to pass, which is conveyed therein by a funnel 11, arranged in the upper end of the tube 8, the funnel being provided with a hinged lid 11', so the top can be closed.

The receptacle 7, is provided with upwardly projecting tubes 12, communicating with openings formed in its bottom, these tubes extending up above the filtering material preferably sand, which is arranged in the receptacle 7, whereby the water will pass upwardly through the sand, and out through the tubes into the receptacle containing the limestone or gravel, before it reaches the water reservoir, and it will be seen that the water will be kept cool and can be readily drawn off when desired.

In the modification shown in Fig. 3, I show a receptacle 13, for holding the gravel or limestone secured to the cylinder 14 by bolts.

I claim—

1. A water filter comprising a vessel having a cylinder arranged therein, forming an ice chamber, and a water vessel, a receptacle arranged within the inner cylinder near its upper end and containing filtering material, a supply pipe extending downwardly into said receptacle and perforated at its lower end, said pipe terminating at the bottom of said receptacle, and a second receptacle having a perforated bottom arranged within said cylinder below the first said receptacle and containing gravel or limestone, and a tube extending from a point above the filtering material through the bottom of the first said receptacle, substantially as described.

2. A water filter comprising a vessel having a cylinder arranged therein forming an ice chamber and a reservoir, spigots communicating with said reservoir and ice chamber, brackets secured to the inner side of said cylinder, receptacles mounted on said brackets, one of said receptacles being provided with perforated bottom, and the other one with an upwardly projecting tube provided with perforations at its lower ends, the first mentioned receptacle being adapted to contain gravel or limestone and the last mentioned receptacle being adapted to contain filtering material, a cover arranged over said chamber and reservoir, and a funnel extending into said tube.

3. A water filter comprising a reservoir, a receptacle arranged in said reservoir near its upper end, said receptacle being open at the top and having a substantially imperforate bottom, a water supply tube extending downwardly into said receptacle and having its lower end closed by said imperforate bottom, the walls of said tube being perforated near the lower end, filtering material in said receptacle, a tube extending from a point above said filtering material through said material and said bottom, substantially as described.

4. A water filter comprising a reservoir, a receptacle supported in the upper end of said reservoir, said receptacle being open at the top and having a substantially imperforate bottom, a cover for said reservoir, a water tube extending through said cover and into said receptacle, the lower end of said tube being closed by the bottom of said receptacle and the walls of said tube being perforated near the lower end, filtering material in said receptacle and a plurality of tubes extending from a point above said filtering material through the bottom of said receptacle, substantially as described.

In testimony whereof I have signed my name to this specification in the presence of two subscribing witnesses.

ROBERT M. BAXTER.

Witnesses:
   FRANCES E. SHEEHY,
   HELEN F. LILLIS.